United States Patent [19]

Heiss

[11] Patent Number: 4,462,829

[45] Date of Patent: Jul. 31, 1984

[54] RUST CONVERTING AND RUST INHIBITING PRIMER

[76] Inventor: Adolf Heiss, P.O. Box 251, Richmond Hill, N.Y. 11419

[21] Appl. No.: 484,940

[22] Filed: Apr. 14, 1983

[51] Int. Cl.³ ............... C09D 3/64; C09D 5/02; C09D 5/08; C09D 5/12

[52] U.S. Cl. .............. 106/14.05; 106/14.11; 106/14.13; 106/14.18; 106/14.24; 106/14.34; 106/14.36; 106/14.37; 106/259; 106/264

[58] Field of Search .............. 106/14.05, 14.11, 14.13, 106/14.18, 14.24, 14.34, 14.36, 14.37, 259, 264

[56] References Cited

U.S. PATENT DOCUMENTS

| | | | |
|---|---|---|---|
| 2,149,914 | 3/1939 | Greager et al. | 106/14.24 |
| 2,149,915 | 3/1939 | Greager et al. | 106/14.24 |
| 2,997,398 | 8/1961 | Kronstein et al. | 106/14.37 |
| 3,017,283 | 1/1962 | Bennetch et al. | 106/14.34 |
| 3,598,616 | 8/1971 | Gibson et al. | 106/14.37 |
| 3,876,574 | 4/1975 | Nagahisa et al. | 106/14.37 |
| 4,094,837 | 6/1978 | Johnson | 106/14.24 |
| 4,130,524 | 12/1978 | Boerwinkle et al. | 106/14.18 |
| 4,211,565 | 7/1980 | Hund et al. | 106/14.05 |
| 4,359,338 | 11/1982 | Winstead | 106/14.24 |

FOREIGN PATENT DOCUMENTS 57-16794  1/1982  Japan .............. 106/14.05

Primary Examiner—Ronald W. Griffin
Attorney, Agent, or Firm—Robert E. Burns; Emmanuel J. Lobato; Bruce L. Adams

[57] ABSTRACT

A rust converting and rust inhibiting primer is disclosed which comprises an aqueous suspension or aqueous emulsion of an alkyd resin, about 150 to 275 parts by weight of pigment containing at least 50 parts by weight of red iron oxide pigment, the remainder being extender pigment, a drying accelerator for said alkyd resin composed of one or more polyvalent metal salts in an amount of about 0.5 to 1.5 parts by weight of said metal and about 1 to 7 parts by weight of a surfactant active as an oil-and-water dispersant or emulsifier all parts by weight being based on 100 parts by weight of said alkyd resin. The primer is compatible with a wide variety of coatings and can be applied directly to a clean or corroded surface of a metal.

20 Claims, No Drawings

RUST CONVERTING AND RUST INHIBITING PRIMER

BACKGROUND OF THE INVENTION

This invention relates to a rust converting and rust inhibiting composition, and more particularly, to a primer composition in the form of an aqueous suspension or aqueous emulsion, which is capable of lifting rust from steel and providing the steel with a corrosion resistant surface.

Removal and prevention of corrosion, particularly rust on steel surfaces, continue to be serious problems. At the present time, to provide corroded metal with a corrosion resistant surface, it is necessary for the metal to be cleaned by mechanical and/or chemical means before application of the primer, otherwise the corrosion continues. Further, available rust inhibiting primers have serious disadvantages.

A rust inhibiting primer composed of red lead and iron oxide, as well as a rust inhibiting primer having a fish oil base are well known. However, these primers are not adequate to protect steel from corrosion, particularly when the steel is subjected to relatively severe conditiions.

According to British Pat. No. 915,512, a nonaqueous primer with rust inhibiting properties is obtained by means of a phosphate of calcium or zinc as the rust inhibitor.

A protective coating composition is disclosed in U.S. Pat. No. 3,249,447 which contains a siccative organic coating composition and a polyvalent metal of a di-(aromatic)phosphinate.

In U.S. Pat. No. 4,064,084 a corrosion inhibiting poly-(arylene sulfide) coating has been disclosed. This coating must be heated to a temperature of 500°–900° F. to effect a cure, which is an obvious disadvantage.

According to U.S. Pat. No. 4,086,182, a composition which contains a synthetic binding agent and a complexing agent for iron, which is a polymeric esterification product of an aromatic oxycarboxylic acid containing phenolic groups, is capable of converting a surface film of an oxide on iron or steel and to provide a corrosion resistant film. However, the resultant film is deep black in color and moreover, must be removed prior to the application of another coating, since it does not adhere to other paints.

An anticorrosive pigment is disclosed in U.S. Pat. No. 4,211,565 which is obtained by calcining 30 to 70 mol percent of magnesium, calcium and/or zinc oxide, 70 to 30 mol percent of iron oxide and up to 20 mol percent of chromium oxide at a temperature of 200° to 900° C.

An inexpensive, efficient and effective composition which both removes or converts active corrosion to the passive form and provides a protective film which inhibits further corrosion, even under severe conditions, and which is also compatible with other paints has not been disclosed up to the present time.

SUMMARY OF THE INVENTION

The principal object of the present invention is the provision of a composition which converts rust on the surface of a metal to an inactive or passive form and which provides a coating which inhibits further corrosion.

Another important object of the invention is the provision of a composition which lifts rust from a metal surface and which provides a protective film which inhibits corrosion, even under severe conditions.

A further important object of the invention is the provision of a composition which not only lifts rust from a metal surface and provides a coating which inhibits further corrosion, but is also compatible and adherent to other commonly used paints and primers.

A further object of this invention is the provision of a rust converting and rust inhibiting primer which is flexible, has good adhesion to steel and which is compatible with other coatings.

Still another object of this invention is the provision of a rust converting and rust inhibiting primer which dries rapidly in the air under ordinary conditions of temperature and pressure.

These and other objects of the invention are obtained by a rust converting and rust inhibiting primer which is comprised of an aqueous suspension or aqueous emulsion of an alkyd resin, about 150 to 275 parts by weight of pigment containing at least about 50 parts by weight of red oxide pigment and the remainder being extender pigment, a drying accelerator for the alkyd resin which is a salt of a polyvalent metal, in an amount of about 0.50 to 1.5 parts by weight of the polyvalent metal and about 1 to 7 parts by weight of a surfactant which is active as an oil-and-water dispersant or emulsifier, all parts by weight being based on 100 parts by weight of the alkyl resin.

DESCRIPTION OF THE INVENTION

The term "rust converting", as used herein, means that rust, i.e., iron oxide, is converted into a different form, probably a more complex structure which is not actively corrosive. Further, it is believed that the primary composition of the invention provides an absorbing action which raises the corrosion product from the substrate. This lifting is further activated or aided by the chemical reaction which converts the rust when the wet film of the primer contacts the clean metal surface. The corrosion product thus becomes part of the paint film, where it is enveloped by the resinous portion of the film and prevented from further contact with oxygen and moisture. In this way, the further formation of corrosion products, particularly rust, is prevented.

The drying resin, which is responsible for the formation of the film on the surface of the steel, is preferably a medium or long oil alkyd resin such as a soya or tall oil alkyd resin; soya-phthalic anhydride alkyds are particularly preferred.

A surfactant which is effective as an oil-and-water dispering or emulsifying agent is essential in the instant composition; nonionic surfactants including for example ethylene oxide surfactants, i.e., polyoxyethylene, ethoxylated alcohol and the like can be used, although ionic surfactants, particularly amine salts of long chain unsaturated fatty acids such as oleic, lauric and stearic acids are preferred and the triethanolamine salts are particularly preferred. The surfactant is present in the composition of the invention in an amount of about 1 to 7 parts by weight and more preferably, about 2 to 4 parts by weight per 100 parts by weight of the resin.

The composition of the invention contains a pigment in an amount of about 150 to 275 and more preferably, about 180 to 250 parts by weight per 100 parts by weight of resin. Of the pigment, at least about 50 parts by weight is red oxide pigment, i.e., $Fe_2O_3$. The maximum amount of red oxide pigment present in the composition of the invention is not critical; however, for economy, the maximum amount is preferably about 100 parts by weight and more preferably, about 65 parts by weight per 100 parts by weight of the pigment. The remainder of the pigment is extender pigment, such as calcium carbonate or silica. Other pigments such as zinc oxide and lead peroxide may also be included in the composition of the invention, in minor amounts, as a substitute for or in addition to the extender pigment. For example, zinc oxide may be used in an amount of 0.2 to 2.5 parts by weight per 100 parts by weight of the resin and lead oxide in an amount of about 1 to 3 parts by weight per 100 parts of the resin. Likewise, zinc phosphate and calcium borosilicate, which are nontoxic rust inhibitors and are helpful in increasing the length of the effectiveness of the inhibitor action may be present in the composition of the invention in amounts of about 5 to 15 parts by weight, based on 100 parts by weight of the alkyd resin.

As a drying accelerator for the alkyd resin, one or more polyvalent metal salt is included in the composition in an amount of about 0.5 to 1.5 parts by weight based on 100 parts by weight of the alkyd resin. Preferably, the drying accelerator is an oil soluble salt of at least two metals selected from cobalt, manganese, lead, zinc and zirconium.

A pigment antisettling agent usually a clay, such as BENTONE, is advantageously included in the composition of the invention in an amount of about 1 to 4 parts by weight, and more preferably, about 1.5 to 2.5 parts by weight per 100 parts by weight of the alkyd resin. Likewise, a pigment dispersion or wetting agent, known in the art, such as a soya-lecithin composition is desirably included in the composition of the invention in an amount of about 2 to 10 parts and more preferably, 4 to 8 parts by weight per 100 parts by weight of the alkyd resin.

Among other agents which may be included in the composition of the invention is a chelating or sequestering agent such as the disodium salt of ethylenediaminetetraacetic acid in an amount of about 1 to 4 parts by weight and more preferably, about 2-3 parts by weight based on 100 parts by weight of the resin.

As the vehicle for the rust-converting and rust-inhibiting primer of the invention, a mixture of water and organic solvents is preferred. The proportion of water to organic solvent in parts by weight, is about 1:4 to 1.5:1, and more preferably, about 1:2 to 1:0.8. Of the organic solvent, the major amount is a nonpolar solvent, such as naphtha or mineral spirits and a minor amount, i.e., about 2 to 25 percent and more preferably, about 5 to 16 percent of the organic solvent is a polar solvent, such as a lower alcohol, ethylene glycol, cellosolve acetate, propylene carbonate and the like. Based on 100 parts per weight of the resin, the vehicle of the primer of the invention is preferably composed of about 4 to 20 and more preferably, about 6 to 15 parts per weight of polar solvent, about 80 to 150 and more preferably about 90 to 110 parts per weight of nonpolar solvent and about 50 to 125 and more preferably about 80 to 110 parts by weight of water.

If it is desired to thin the primar, additional nonpolar solvent, such as petroleum spirits can be added without detriment.

It is a particular advantage of the invention that the primer may be applied directly to the corroded surface of the metal to be protected; it is desirable to remove any losse pieces of rust, usually dusting off of loose particles of rust, by a rag or soft brush is sufficient; cleaning by mechanical means such as a wire brush and/or chemical means before application of the primer of the invention is not necessary. The rust converting and rust inhibiting primer of the invention, which can be applied by conventional means such as brushing, rolling and spraying, is effective not only to inhibit further corrosion, but to convert adherent rust on the surface of the metal to a nonactive form and also to lift the corrosion from the surface of the metal and envelope it in the resin.

A coating of the primer composition of the invention is set, i.e., dried to the touch in about six hours, dried hard enough for recoating in twelve hours and dried throughout in sixteen hours.

Adhesion of a film of the primer of the invention to clean and corroded steel, galvanized metal and previously painted surfaces is excellent. The primer of the invention even adheres well directly to zinc-galvanized metals without prior preparation. The rust converting and rust inhibiting primer of the invention is exceedingly compatible and can be coated directly on top of a variety of coatings, and can also be overcoated with a wide variety of coatings including alkyd enamels, aluminum paint, acrylic enamels, urethanes, epoxy-polyamides, epoxy esters, two-component acrylic-polyurethane, two-component water-epoxy, high gloss moisture-cure polyurethane, linseed oil, and even specialized paints, such as bridge paint which meets federal specification TTP 651-D and bridge paint which meets New York specification 708-110.

In addition to its excellent compatibility with other coatings, fast drying and effectiveness in converting and inhibiting rust, the primer of the invention has excellent flexibility and freeze-thaw resistance. No cracking is observed when a coating of the primer of the invention is bent over a $\frac{1}{4}$ inch mandrell through 180° and the primer of the invention can be applied at 35° F., even to damp surfaces.

The following examples further illustrate the best mode currently contemplated for carrying out the invention, but must not be construed as limiting the invention in any manner whatsoever.

EXAMPLE 1

Preparation of The Rust Converting And Rust Inhibiting Primer

A soya-alkyd resin (100 percent solids, 23-25 percent phthalic anhydride, manufactured by Cellomer) in an amount of 85 kg., 1.7 kg. of the antisettling agent, BENTONE 34, (manufactured by National Lead), 12 kg. of methanol and 2.8 kg. of soya-lecithin a pigment dispersing agent are mixed at ambient temperature of about 20°-27° C. Red oxide pigment ($Fe_2O_3$) in an amount of 45 kg., and calcium carbonate, an extender pigment in an amount of 150 kg. are added and ground together with the initial mixture to hegman 6. A drying accelerator for the resin composed of 1.36 kg. of 12% cobalt naphthenate, 1.8 kg. of 6% manganese naphthenate and 1.8 kg. of zirconium naphthenate is added together with 91 kg. of petroleum spirits.

Water in an amount of 94.5 kg. and 2 kg. of triethanolamine oleate are combined and mixed with the ground mixture of alkyd resin and pigment.

EXAMPLE 2

Preparation of The Rust Converting And Rust Inhibiting Primer

A soya-alkyd resin (100 percent solids, 23–25 percent phthalic anhydride, manufactured by Cellomer) in an amount of 87.5 kg., 1.8 kg. of the antisettling agent, BENTONE 34, (manufactured by National Lead), 0.45 kg. of methanol and 3.6 kg. of the pigment dispersing agent, soya-lecithin, are mixed at ambient temperature of about 20°–27° C. Red oxide pigment ($Fe_2O_3$) in an amount of 45.3 kg., calcium carbonate in an amount of 147 kg. and calcium borosilicate in an amount of 6.8 kg. are added and ground together with the initial mixture to hegman 6. As the drying accelerator for the resin, the same ingredients in the same proportion as in Example 1, but in a total amount of 3.6 kg., are added together with 88.5 kg. of petroleum spirits and cellosolve acetate in an amount of 3.6 kg. to reduce the consistency of the mixture.

Water in an amount of 91 kg., 1.8 kg. of triethanolamineoleate, 2.3 kg. of ethylene glycol and 1.8 kg. of the disodium salt of the ethylenediaminetetraacetic acid are combined and when fully dispersed are mixed with the ground mixture of alkyd resin and pigment. Zinc oxide in an amount of 0.2 kg. and lead peroxide in an amount of 1 kg. are then added to complete the composition.

EXAMPLE 3

Preparation of The Rust Converting And Rust Inhibiting Primer Composition

The same soya-alkyd resin used in Example 1 in an amount of 87.5 kg. is mixed with 1.8 kg. of BENTONE 34, manufactured by National Lead, 0.45 kg. of propylene glycol and 7.25 kg. of the soya-lecithin pigment dispersing agent at ambient temperature. Red oxide pigment in an amount of 56.7 kg., silica as an extender pigment in an amount of 147 kg. and calcium borosilicate in an amount of 11 kg., are ground together with the alkyd resin mixture to hegman 7. The mixture is then thinned by adding 88.5 kg. of petroleum spirits and 5.4 kg. of cellosolve acetate, a drying accelerator for the alkyd resin composed of cobalt naphthenate, manganese naphthenate and zirconium naphthenate in the same proportion used in Example 1, but in a total amount of 3.6 kg. is combined with the mixture.

Water in an amount of 91 kg., triethanolamine oleate in an amount of 3.2 kg., ethylene glycol in an amount of 4.5 kg. and the disodium salt of ethylenediaminetetraacetic acid in an amount of 1.8 kg. are combined and then mixed with the alkyd resin pigment mixture. Zinc oxide in an amoiunt of 1.8 kg. and 3 kg. of lead peroxide are then added to the composition.

EXAMPLE 4

Determination of Corrosion Resistance

Cold rolled, hot rolled and pickled steel panels were exposed to a salt spray atmosphere in a salt spray cabinet to produce a corrosion deposit. The corroded panels were rinsed and dried and then coated with the rust converting and rust inhibiting primer of the invention produced in accordance with Example 1.

The dry film thickness was 3.0 mils or 75 microns. The coated panels were permitted to air dry for 18 hours and were then reexposed to salt spray in accordance with ASTM B 117.

After 800 hours of exposure, the panels were examined. No evidence of corrosion deposit was found on the surface of the primer coating.

COMPARATIVE EXAMPLE A

Determination of Corrosion Resistance Using Comparative Primers

Steel panels were exposed to a salt spray atmosphere in accordance with Example 4, rinsed and dried and then coated with two primers, one complying with the requirements of Federal Specification TT-P-86 type II, which is a red lead-iron oxide primer, and one complying with Federal Specification TT-C-530B, which is fish-oil base rust inhibiting primer.

After 600 hours of exposure, the panels were examined and some corrosion deposits on the surface of the red lead-iron oxide primer were found, with several ruptures in the paint film. The same condition was found on the surface of the fish-oil based primer.

EXAMPLE 5

Determination of Corrosion Resistance Of Panels Coated With The Primer Of The Invention And Various Top Coats Corroded and rust covered steel panels prepared as in Example 4, were coated with the primer of the invention prepared according to Example 1. After drying overnight in the air, the panels were then coated with the following top coats:

A. Exterior alkyd enamel (TT-E-489)
B. Epoxy-polyamide enamel
C. Solvent based acrylic enamel
D. Urethane base enamel (aliphatic).

The coated panels were exposed to a salt spray test (ASTM B 117) for 600 hours.

A second series of panels were prepared in the same manner and were exposed to accelerated weathering (ASTM E 42) for 300 hours.

The exposed panels were examined and the following observations were made.

Salt spray exposed panels: none of these panels showed any evidence of corrosion deposits on the enamel coat.

Weathered panels: none of the panels showed any evidence of corrosion deposit on the enamel coat.

EXAMPLE 6

Determination of Compatibility

To determine the capability of the primer of the invention to maintain adhesion with various types of top coats, the following materials were applied over the primer prepared in accordance with Example 1 after two days of air drying:

A. Alkyd enamel
B. Epoxy enamel (two-component)
C. Solvent based acrylic enamel
D. Aliphatic urethane enamel.

The coated panels were exposed to 300 hours of salt spray (ASTM B 117) and to 600 hours of accelerated weathering (ASTM E 42).

The exposed panels were then examined; none showed any evidence of rust formation either on or beneath the top coat.

None of the panels showed any loss in intercoat adhesion nor in overall adhesion to the initially rusty surface.

The weathered panels were subjected to an adhesion test, using the 25 square cross-hatch tests. None of the panels showed any loss in intercoat adhesion, nor in overall adhesion to the initially rusty surface.

EXAMPLE 7

Determination of the Form of the Iron Compound after Application of the Primer

Attempts were made by x-ray diffraction to idenify the mineral phase on the surface of the steel, as well as in the paint itself after application and drying of a coat of the primer prepared as in Example 1 and applied to a corroded steel surface as in Example 4. Examination of the x-ray scan showed the presence of hematite ($Fe_2O_3$) on the surface as well as within the layer of primer. A portion of the iron compound was identified as ferrous oxide (FeO) with an indefinite crystal structure. Since $Fe_3O_4$ is actually a coprecipitate of $Fe_2O_3$ and FeO, it is assumed that both forms of the iron oxide are present.

What I desire to claim and protect by Letters Patent is:

1. A rust converting and rust inhibiting primer comprising an aqueous suspension or aqueous emulsion of an alkyd resin, about 150 to 275 parts by weight of pigment containing at least 50 parts by weight of red iron oxide pigment, the remainder being extender pigment, a drying accelerator for said alkyd resin composed of one or more polyvalent metal salts in an amount of about 0.5 to 1.5 parts by weight of said polyvalent metal and about 1 to 7 parts by weight of a surfactant active as an oil-and-water dispersant or emulsifier, all parts by weight being based on 100 parts by weight of said alkyd resin.

2. The rust converting and rust inhibiting primer according to claim 1 in which said drying resin is a soya-phthalic anhydride alkyd resin.

3. The rust converting and rust inhibiting primer according to claim 1 which contains about 50 to 100 parts by weight of red iron oxide pigment and about 100 to 200 parts by weight of extender pigment.

4. The rust converting and rust inhibiting primer according to claim 1 which contains about 50 to 65 parts by weight of red iron oxide pigment and about 120 to 175 parts by weight of extender pigment.

5. The rust converting and rust inhibiting primer according to claim 1 in which said extender pigment is principally calcium carbonate or silica.

6. The rust converting and rust inhibiting primer according to claim 6 in which said extender pigment is principally calcium carbonate or silica and which also contains a minor amount of at least one member of the group consisting of zinc oxide, zinc phosphate, calcium borosilicate and lead peroxide.

7. The rust converting and rust inhibiting primer according to claim 1 in which said surfactant is an amine salt of an unsaturated long chain fatty acid.

8. The rust converting and rust inhibiting primer according to claim 1 in which said surfactant is a triethanolamine salt of a long chain unsaturated fatty acid.

9. The rust converting and rust inhibiting primer according to claim 1 in which said surfactant is triethanolamine oleate.

10. The rust converting and rust inhibiting primer according to claim 1 in which the drying accelerator is selected from an oil soluble salt of at least two metals selected from the group consisting of cobalt, manganese, lead, zinc and zirconium.

11. The rust converting and rust inhibiting primer according to claim 1 in which said aqeuous suspension or aqueous emulsion also contains an antisettling agent for said pigment.

12. The rust converting and rust inhibiting primer according to claim 1 in which said aqueous suspension or aqueous emulsion also contains a pigment dispersing agent.

13. The rust converting and rust inhibiting primer according to claim 1 in which said aqueous suspension or aqueous emulsion contains an antisettling agent for said pigment and a pigment dispersing agent.

14. The rust converting and rust inhibiting primer according to claim 13 in which said antisettling agent is clay and said pigment dispersing agent is a soya-lecithin dispersing agent.

15. The rust converting and rust inhibiting primer according to claim 1 in which said aqueous suspension or aqueous emulsion contains as a vehicle, in addition to water, a major amount of petroleum spirits and a minor amount of polar solvent.

16. A method for converting rust to a noncorrosive composition and inhibiting corrosion on a metal surface comprising removing loose rust from the surface of said metal and then applying directly on the rust corroded surface of said metal a coating of primer composed of an aqueous suspension or aqueous emulsion of an alkyd resin, about 150 to 275 parts by weight of pigment containing at least 50 parts by weight of red iron oxide pigment and the remainder being extender pigment, a drying accelerator for said alkyd resin which is at least one polyvalent metal salt in am amount of about 0.5 to 1.5 parts by weight of said metal and about 1 to 7 parts by weight of a surfactant active as an oil-and-water dispersant or emulsifier, all parts by weight being based on 100 parts by weight of said alkyd resin.

17. A rust converting and rust inhibiting primer comprising an aqueous suspension or aqueous emulsion of a film forming component consisting essentially of an alkyd resin, about 150 to 275 parts by weight of pigment consisting essentially of extender pigment and at least 50 parts by weight of red iron oxide pigment, a drying accelerator for said alkyd resin composed of one or more polyvalent salts in an amount of about 0.5 to 1.5 parts by weight and about 1 to 7 parts by weight of a surfactant which is active as an oil-and-water dispersant or emulsifier, all parts by weight being based on 100 parts by weight of said alkyd resin.

18. The rust converting and rust inhibiting primer according to claim 17 in which said surfactant is an amine salt of an unsaturated long chain fatty acid.

19. The rust converting and rust inhibiting primer according to claim 17 in which said surfactant is a triethanolamine salt of a long chain unsaturated fatty acid.

20. The rust converting and rust inhibiting primer according to claim 17 in which said surfactant is triethanolamine oleate.

* * * * *